Patented May 1, 1928.

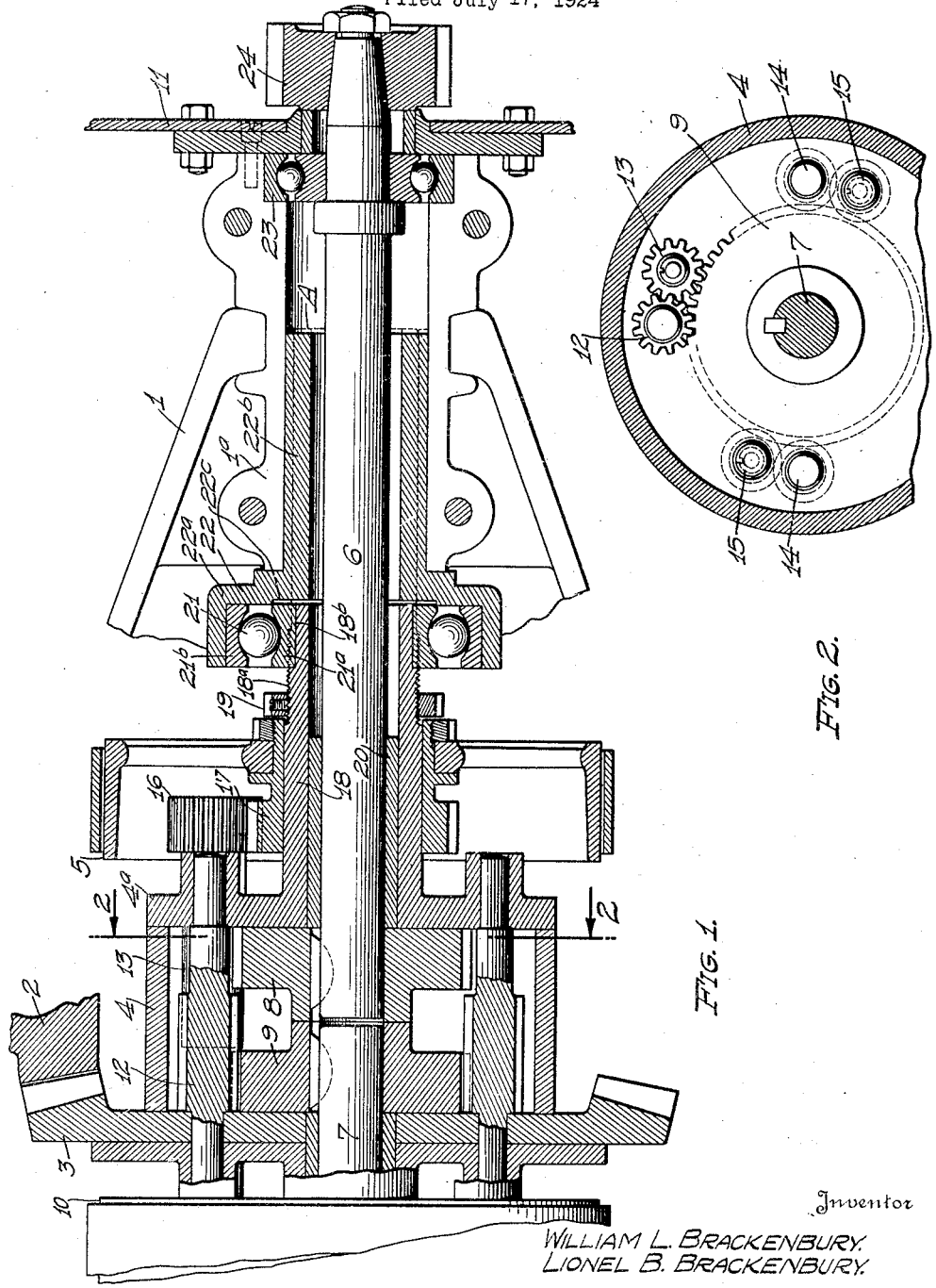

1,668,352

UNITED STATES PATENT OFFICE.

WILLIAM L. BRACKENBURY AND LIONEL B. BRACKENBURY, OF EL CENTRO, CALIFORNIA.

BALL-RACE HOUSING MEANS FOR DIFFERENTIAL TRANSMISSION MECHANISMS.

Application filed July 17, 1924. Serial No. 726,520.

Our invention relates to a ball-race housing and supporting sleeve for revolubly supporting a compensating sleeve of a differential transmission mechanism.

It has been customary practice in the manufacture of a certain tractor, known as the Cletrac tank-type tractor, to extend the compensating case sleeve of the differential mechanism thereof and upon which the steering brake drum in the transmission case is revolubly mounted, from the compensating case into and through a babbitt bushing, which is clamped between the journal portion and the long bearing cap at the lateral ends of the transmission case. It has also been customary practice to provide a locating spacer for locating and spacing the compensating sleeve between the compensating case and the journal for the babbitt sleeve in which the one end of the compensating sleeve is revolubly mounted. With the above construction it was necessary to often replace the babbitt bushing and often many other parts resulting from the wearing out of the former. To relieve the repeated necessity of installing parts or rebuilding the transmission mechanism, we have provided an improvement in a ball-race housing and supporting sleeve.

The objects of our invention are: first, to provide a means of this class which will not be materially affected by the copper shavings, wires, slivers or the like worn or broken from the brake lining of the steering brake bands, as in the case of the conventional babbitt bushing bearing; second, to provide a means of this class which serves as a compensating sleeve locating spacer for locating and spacing the compensating sleeve between the compensating case and the main journal; third, to provide a ball-race housing and supporting sleeve which is clamped in the journal of the transmission case for revolubly supporting the compensating sleeve and axially spacing the same; fourth, to provide a ball-race housing and sleeve whereby the transmission mechanism at the rear end of tractors now in use may be easily rebuilt with a minimum amount of effort and expense and with only one change to the mechanism as now built and as shown in the drawings, and fifth, to provide a novelly constructed ball-race housing and sleeve, one which is very simple and economical to construct, durable, and which will not readily deteriorate or get out of order.

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a longitudinal sectional view in plan of one side of the differential and transmission mechanism at the rear end of a tractor, with the section taken through the middle of the mechanism, showing certain parts and portions fragmentarily, and showing the former arrangement of parts by dotted lines, and Fig. 2 is a fragmentary transverse sectional view of the compensating case with the section taken through 2—2 of Fig. 1, showing the general arrangement of the gear mechanism in the compensating case.

Like characters of reference refer to similar parts and portions throughout the views of the drawings.

The transmission mechanism mounted in the transmission case 1 of the tractor consists primarily of a bevel drive pinion 2 connected to the drive-shaft of the engine, a bevel drive gear 3 meshing with and driven by the bevel drive pinion 2, a compensating gear case 4 secured to the gear side of the bevel drive gear 3, a pair of main drive-shafts 6 and 7 keyed to the main drive-shaft gears 8 and 9 positioned within the compensating gear case, a pair of spaced apart steering brake drums 5 and 10 driven by the compensating gears within the compensating gear case, and rear drive sprocket dust shields 11 through which the main drive-shafts 6 and 7 and the axles extend, upon which axles are mounted the rear drive sprockets driven by the rear drive sprocket pinions secured at the ends of the main drive-shafts. The main drive-shaft gears 8 and 9, mounted centrally within the compensating gear case 4, are spaced apart at their outer portions. Within the compensating gear case are revolubly mounted a plurality of compensating pinions 12, 13, 14 and 15, the pinions 12 and 15 meshing with the main drive-shaft gear 9 and the pinions 13 and 14 meshing with the main drive-shaft gear 8, and the pinions 12 and 13, as well as the pinions 14 and 15, meshing respectively with each other. The one ends of the pinions 13 extend through the compensating gear case and are provided at said ends with steering pinions 16 which mesh with a compensating steering gear 17 secured to the steering brake drum 5 and revolubly mounted on the compensating case sleeve 18. The sleeve 18 is secured to the cover of the case 4 on one side and with a corresponding plate on the other side, and is provided with an externally threaded portion 18$^a$ near its outer end on which is screwed a retaining nut 19 at a spaced distance from the hub of the steering brake drum 5, formed by the gear 17, to permit axial movement of said brake drum. At the central portion of the compensating case cover 4$^a$ and within the sleeve 18 is secured a sleeve 20 in which is revolubly mounted one of the main drive-shafts 6.

In the transmission mechanism of the tractors now in use the sleeve 18 extends to the dotted line position indicated by A in the drawings. In our structure we have reduced the length of this sleeve and turned down the end thereof, as indicated by 18$^b$. On this turned down portion of the sleeve 18 is driven the inner race member 21$^a$ of the ball-race 21. The outer race member 21$^b$ of the ball-race 21 is driven in the cup-shaped or drum portion 22$^a$ of the ball-race housing 22. This housing is provided with a hollow shank or sleeve 22$^b$, which is clamped in a longitudinally split journal 1$^a$ which consists of a lower journal member and an upper cap secured together by a plurality of bolts, as shown. This longitudinally split journal is provided with an annular channel intermediate its ends into which extend semi-annularly shaped flanges on the transmission case and cover therefor, as shown, said case and cover being separated on the axial line of the shaft 6 and on a plane coincident with the separating plane of the journal members. Said case and cover are secured together by any suitable means, whereby the journal is rigidly secured in position. Within the drum portion of the housing 22 is provided a recess 22$^c$ for receiving the inner race member 21$^a$ when the ball-race 21 wears slightly, and therefore permits slight axial movement of the sleeve 18 relatively to the transmission case and also serves as a compensating sleeve locating spacer to take the place of the spacer now employed and positioned between the nut or nuts 19 and the inner end of the journal portion 1$^a$ of the transmission case 1.

Near the end of the main drive-shafts are provided ball-races 23 to position the shafts centrally within the journal portions 1$^a$. At the tapered ends of the main drive-shafts are secured the rear drive sprocket pinions 24, which are adapted to engage with and drive an internal gear secured to the rear drive sprockets.

It is obvious from this construction, as illustrated in the drawings and disclosed in the foregoing specification, that there is provided a means for positioning and revolubly supporting the compensating case sleeves of a transmission mechanism of the class described, as aimed at and set forth in the objects of the invention, and though we have shown and described a particular construction, combination and arrangement of parts and portions, we do not wish to be limited to this particular construction, combination and arrangement, but desire to include in the scope of our invention, the construction, combination and arrangement substantially as set forth in the appended claims.

Having thus described our invention, what we claim as new and desire to secure by Letters Patent, is:

1. In a means of the class described, the combination with a compensating gear means of a transmission mechanism, a case therefor having separable journal portions, a steering brake drum in connection with said compensating gear means, and a compensating sleeve upon which said steering brake drum is revolubly mounted, of a combined ball-race housing and sleeve, the sleeve portion thereof being clamped between the separable members of the journal portions of said case, and a ball-race having its one race member secured within the housing portion of said combined ball-race housing and sleeve and having its other race member secured near the end of said compensating sleeve, there being provided a recess within the housing portion of said combined housing and sleeve to receive the one race member secured to the one end of said compensating sleeve in case of wear.

2. In a means of the class described, a transmission case having longitudinally separable journal portions at its end, a ball race secured between the separable members of said journal portions, at the end thereof, a wheel supporting and drive shaft secured near its outer end in the inner race member of said ball-race, a compensating gear means mounted on the inner end of said shaft and provided with a compensating sleeve extending around said shaft and toward the outer end of said journal portions, a combined ball-race housing and supporting sleeve secured with its sleeve portions between the separable members of said journal portions at the inner end thereof, said combined ball-race housing and supporting sleeve having a ball-race housing at its inner end, and another ball-race having its outer race member secured in said housing portion and its inner race member secured at the outer end of said compensating sleeve.

In testimony whereof, we have hereunto set our hands at San Diego, California, this 7th day of July, 1924.

WILLIAM L. BRACKENBURY.
LIONEL B. BRACKENBURY.